(12) United States Patent
Fargo (10) Patent No.: US 8,151,950 B2
(45) Date of Patent: Apr. 10, 2012

(54) PERMANENT MAGNET ELEVATOR DISK BRAKE

(75) Inventor: Richard N. Fargo, Plainville, CT (US)

(73) Assignee: Otis Elevator Company, Farmington, CT (US)

( * ) Notice: Subject to any disclaimer, the term of this patent is extended or adjusted under 35 U.S.C. 154(b) by 784 days.

(21) Appl. No.: 12/296,152

(22) PCT Filed: Apr. 17, 2006

(86) PCT No.: PCT/US2006/014326
§ 371 (c)(1), (2), (4) Date: Oct. 6, 2008

(87) PCT Pub. No.: WO2007/120132
PCT Pub. Date: Oct. 25, 2007

(65) Prior Publication Data
US 2009/0194370 A1  Aug. 6, 2009

(51) Int. Cl.
*B60L 7/00* (2006.01)
*B60T 13/04* (2006.01)
*B66B 5/16* (2006.01)

(52) U.S. Cl. ......... 188/164; 188/161; 188/171; 187/359

(58) Field of Classification Search .................. 188/161, 188/164, 165, 171, 173; 187/351, 359
See application file for complete search history.

(56) References Cited

U.S. PATENT DOCUMENTS

| | | | |
|---|---|---|---|
| 2,886,149 A | 5/1959 | Baermann | |
| 3,512,618 A | 5/1970 | Schafer | |
| 3,642,104 A | 2/1972 | Schafer | |
| 3,730,317 A | 5/1973 | Jaeschke | |
| 3,741,353 A | 6/1973 | McKinley et al. | |
| 3,866,729 A * | 2/1975 | Eichenhofer | 188/161 |
| 4,811,820 A | 3/1989 | Rossi | |
| 5,121,018 A | 6/1992 | Oldakowski | |
| 5,202,539 A * | 4/1993 | Lamb | 187/351 |

(Continued)

FOREIGN PATENT DOCUMENTS

DE  102005063242 A1 *  6/2007

(Continued)

OTHER PUBLICATIONS

Machine translation of JP 10-184739, Jul. 1998.*

(Continued)

*Primary Examiner* — Thomas J Williams
(74) *Attorney, Agent, or Firm* — Carlson, Gaskey & Olds, P.C.

(57) ABSTRACT

A brake assembly (18) includes a permanent magnet (36) that generates a first magnetic field (52) in a direction that causes application of a clamping force on a brake disk (22). An electromagnet (38) is energized with current of a proper polarity to generate a second magnetic field (54) opposite the first magnetic field (52). The rate and magnitude at which current is applied produces a controlled repulsive force between the two magnetic fields (52, 54) to disengage the brake disk (22). As a distance between the permanent magnet (36) and the electromagnet (38) increases, the difference in field strength decreases until an equilibrium position is obtained. The brake is applied and released in a controlled manner by varying the strength of the second magnetic field (54) relative to the first magnetic field generated by the permanent magnet (36).

20 Claims, 5 Drawing Sheets

U.S. PATENT DOCUMENTS 5,717,174 A 2/1998 Ramos
6,471,017 B1 10/2002 Booz et al.

FOREIGN PATENT DOCUMENTS

| JP | 55-115444 | | 8/1980 |
|---|---|---|---|
| JP | 7-42775 | | 2/1995 |
| JP | 07259905 A | * | 10/1995 |
| JP | 09229104 A | * | 9/1997 |
| JP | 10184739 A | * | 7/1998 |
| JP | 11-215767 | | 8/1999 |
| JP | 2000-509357 | | 7/2000 |
| JP | 2004-353684 | | 12/2004 |

OTHER PUBLICATIONS

International Search Report and Written Opinion dated Jul. 13, 2007.
International Preliminary Report on Patentability mailed on Jul. 15, 2008.

* cited by examiner

PERMANENT MAGNET ELEVATOR DISK BRAKE

This application is a United States National Phase Application of PCT Application No. PCT/US2006/014326 filed Apr. 17, 2006.

1. FIELD OF THE INVENTION

This invention generally relates to elevator systems. More particularly this invention relates to an elevator braking system.

2. DESCRIPTION OF THE RELATED ART

Elevator systems include a braking system to stop and hold an elevator car in a desired position. Typically, a braking system includes springs that force an axially moveable plate against a brake rotor having brake lining material. The resulting friction between the movable plate and the lining material stops and holds the elevator in place. Engagement of the moveable plate is known in the art as dropping the brake and is typically the default condition. The moveable plate is disengaged from the brake lining by a magnetic field generated by an electromagnet. The attractive force generated by the magnetic field overcomes the force of the springs and pulls the moveable plate away from the brake rotor. This is known in the art as lifting the brake.

Electromagnets utilized for generating the magnetic field are inherently unstable in that attractive forces generated by the electromagnet increase as the moveable plate moves out of engagement toward a housing. The plate typically moves through an air gap of approximately 0.3 mm between an engaged and a disengaged position. The movement of the plate though this air gap and resulting contact with the brake rotor or a housing can result in objectionable noise that can be heard within the elevator car. Magnetic fields increase as the ferromagnetic parts come closer together, tending to create an acceleration of the movable plate on lifting that can produce objectionable noises.

If the magnetic field decays too quickly when dropping the brake, then the movable plate is accelerated by the springs against the brake rotor and brake housing also generating noise. The brake noise is reduced somewhat by using a diode circuit to delay the collapse of the magnetic field when dropping the brake. However, such a device can cause undesirable delays in engaging the brake, while not sufficiently reducing the noise.

Additional devices that attempt to reduce noise generated by contact between the plate and the electromagnet housing include the use of elastomeric damping elements, such as O-rings. The O-rings dampen movement to reduce the impact, and reduce noise. Disadvantageously, the O-rings are subject to creep, stress relaxation and aging. Over time these factors degrade the O-ring causing a noticeable increase in noise, along with a reduction in the force that engages the brake. The increase in noise and reduction in engagement force ultimately requires that the brake torque is re-adjusted, and O-rings be replaced in order to maintain the desired noise dampening characteristics. Other known devices include the use of an elastomeric bumper or pad. Such devices also suffer from the limited life span associated with the O-rings.

Accordingly, there is a need for an improved brake system that provides the desired holding and stopping force in a stable controlled manner to prevent undesirable impacts and reduce objectionable noise, improve durability and extend operational life.

SUMMARY OF THE INVENTION

In general terms, this invention is a brake assembly for an elevator system that utilizes a permanent magnet and an electromagnet to stabilize application of a brake.

One example system designed according to this invention includes a permanent magnet that generates a first magnetic field in a direction that causes application of a clamping force on a brake disk. Springs disposed between a fixed electromagnet housing and the plate provide an additional biasing force and adjustment of applied forces on the plate. In one example brake assembly, when the brake is in a dropped or applied position, the attractive force of the permanent magnet and the biasing force of the coil springs clamp a brake disk between a fixed housing and an axially movable plate.

The electromagnet includes a coil that is energized with current of a proper polarity to generate a second magnetic field opposite the first magnetic field. The rate and magnitude at which current is applied to the coil produces a controlled and variable second magnetic field. The second magnetic field produces a repulsive force against the first magnetic field to drive the permanent magnet housing away from the electromagnet housing. As the distance between the permanent magnet housing and the electromagnet housing increases, the difference in field strength between the two magnetic fields decreases until an equilibrium position is obtained.

The brake can then be dropped in a controlled manner by ramping the electromagnetic current level down to regulate movement of the permanent magnet housing as it approaches the electromagnet housing. A controller reduces current to the coil such that the equilibrium position moves closer and closer to the fixed electromagnet housing and the dropped position.

Accordingly, an example brake provides for controlled movement and application of the brake such that noise can be reduced without the use of damping bodies that wear and require replacement. Further, the example brake assembly provides a stable and durable brake assembly.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
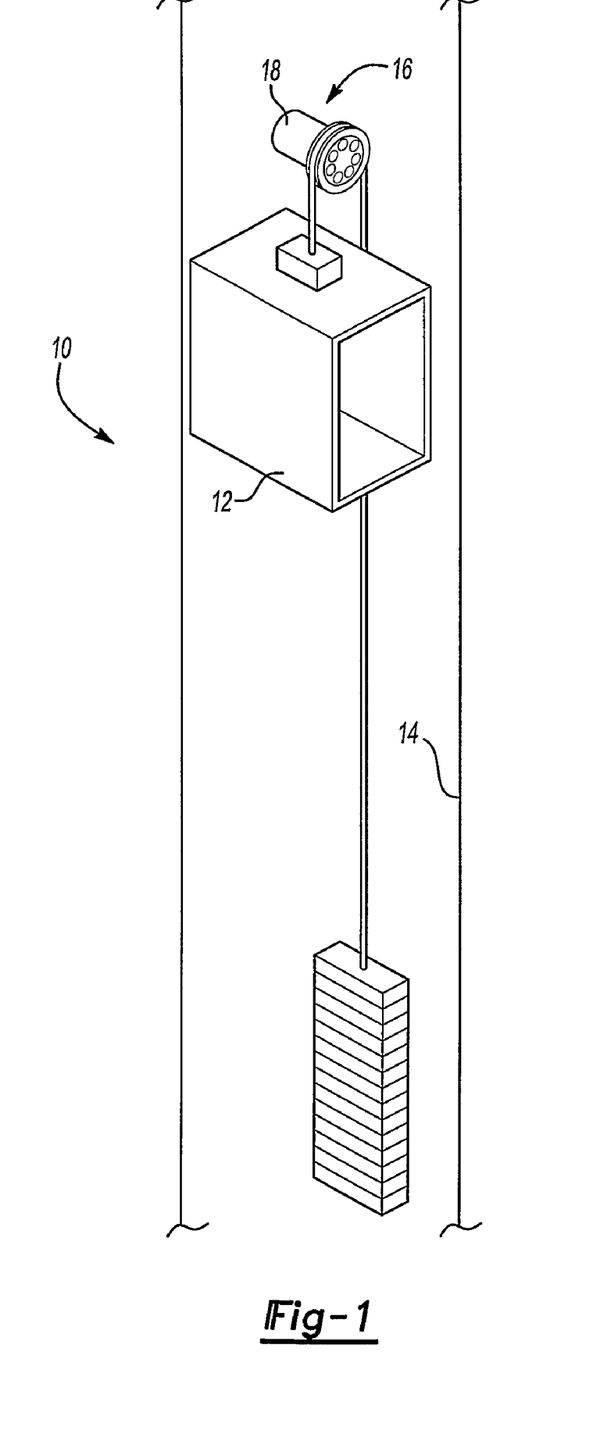
FIG. 1 schematically illustrates an example elevator system according to this invention.

FIG. 1 schematically shows an elevator system 10 including an elevator car 12 movable within a hoistway 14. A motor 16 moves the elevator car 12 in a known manner. A brake assembly 18 utilizes a permanent magnet in combination with an electromagnet to stabilize actuation. The brake assembly 18 is mounted adjacent the motor 16 for stopping and holding the elevator car 12 at a desired position within the hoistway 14.

Figure 2:
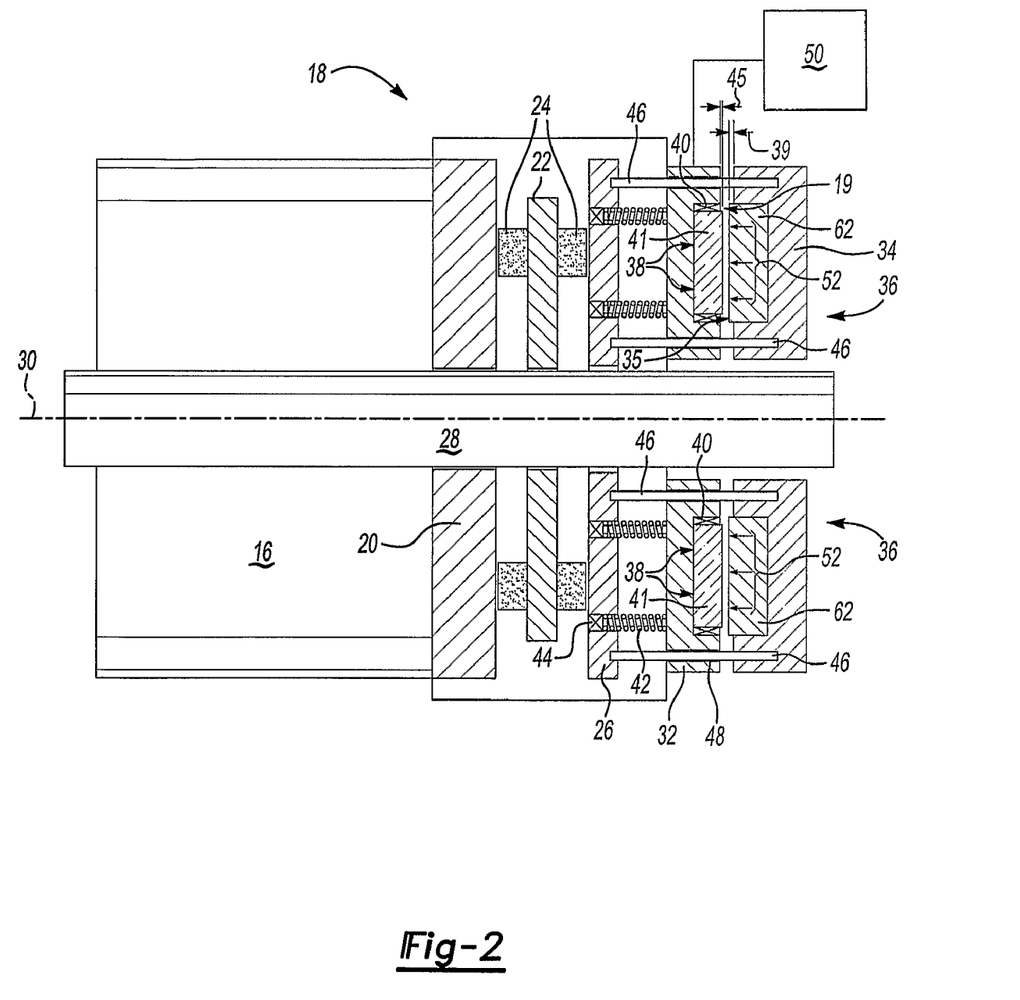
FIG. 2 is a schematic representation of an example elevator brake system designed according to this invention.

Referring to FIG. 2, an example brake assembly 18 is schematically shown in an applied or dropped position. The motor 16 drives a shaft 28 about an axis 30. The shaft 28 extends from the motor 16 and into the brake assembly 18. The brake assembly 18 includes a fixed housing 20, an axially movable disk 22 and an axially movable plate 26. The disk 22 includes friction material 24 that engages both the housing 20 and the plate 26 when in the dropped position. Further, the disk 22 is keyed to the shaft 28 in a known manner to allow axial movement but prevent rotational movement relative to the shaft 28. The keyed feature of the disk 22 is as known, and can be provided for example by a key within a keyway slot, or by mating splines on the disk 22 and shaft 28.

The plate 26 is attached to a permanent magnet housing 34 by pins 46. The pins 46 extend through openings 48 within a fixed electromagnet housing 32. Permanent magnets 36 within the permanent magnet housing 34 generate a first magnetic field 52 providing an attractive force toward the electromagnet housing 32 in the direction indicated by the arrows. The permanent magnets 36 include a face 35 transverse to the direction of the first magnetic field 52.

Figure 3:
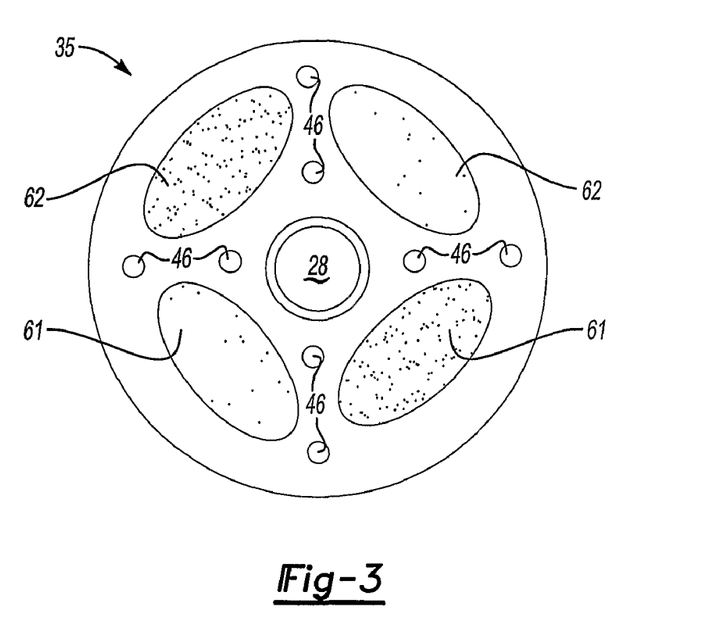
FIG. 3 is a schematic view of a face of an example permanent magnet according to this invention.

Referring to FIG. 3, with continuing reference to FIG. 2, the face 35 includes north portions 61 and south portions 62. The permanent magnets 36 are configured to create the first magnetic field 52. The north and south portions 61, 62 are arranged about the shaft 28. The north and south portions 61, 62 are arranged annularly about the shaft 28 and are elliptically shaped. The elliptical shape maximizes the area of the north and south portions 61, 62 for the permanent magnet face 35. The north and south portions 61, 62 protrude from the face surface 35 a distance 39 to direct repulsive magnetic forces and prevent leakage that could degrade the strength of the magnetic field.

The first magnetic field 52 provides an attractive force that drives the permanent magnet housing 34 toward the electromagnet housing 32 as shown by the arrows 52. The movement of the permanent magnet housing 34 is transferred to movement of the plate 26 through the pins 46. The disk 22 is in turn clamped between the housing 20 and the plate 26 to generate a braking force that prevents rotation of the shaft 28.

Figure 4:
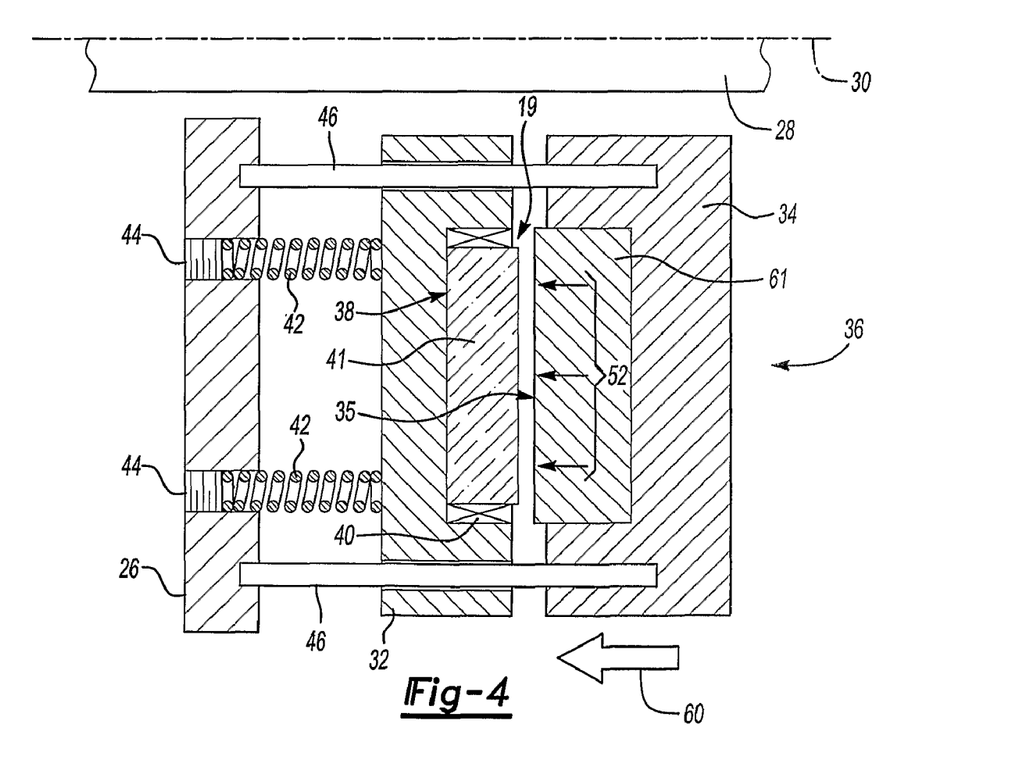
FIG. 4 is a schematic view of an interface between a permanent magnet and an electromagnet in a dropped position.

Referring to FIG. 4, the permanent magnets 36 continuously generate the first magnetic field 52 that produces an attractive force that drives the plate 26 toward the dropped or applied position as is shown by arrow 60. The strength of the magnetic field 52 is of a magnitude required to create a desired force to clamp the disk 22 and create the braking forces required for a specific application.

The electromagnets 38 remain in an unpowered state with the brake assembly 18 in the dropped position. The electromagnet housing 32 is configured to cooperate with the permanent magnets 36 to provide the necessary mating configuration to produce the desired magnitude of the first magnetic field 52.

Figure 5:
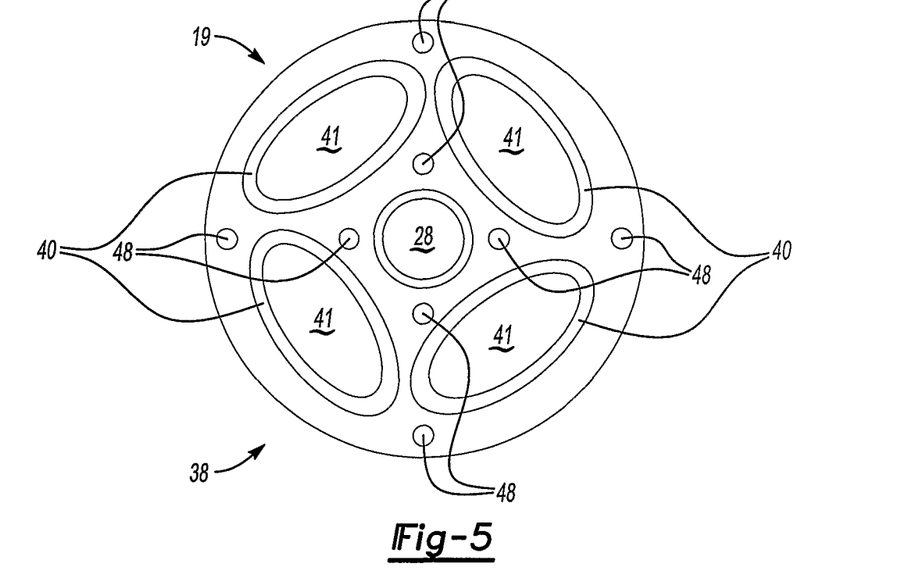
FIG. 5 is a schematic view of a face of an example electromagnet according to this invention.

Referring to FIG. 5, the electromagnets 38 include a face 19 with a series of coils 40 wound around core members 41 and disposed annularly about the shaft 28. The cores 41 protrude outwardly form the face 19 a distance 45 (FIG. 2) to generate the desired repelling magnetic force. The majority of the magnetic field generated by the electromagnets 38 passes through the cores 41. The cores 41 are disposed in a parallel and aligned manner with the poles 61 and 62 of the face 35 of the permanent magnet 36. The electromagnet face 19 is configured to reduce the amount of magnetic flux that crosses the air gap therebetween. Such magnetic flux that crosses this air gap limits the ability to provide a repulsive force.

Although a specific configuration is illustrated, a worker with the benefit of this disclosure would understand that other configuration would fall within the contemplation of this invention to include features to optimize the attractive forces generated by the permanent magnets 36. For example, such features could include a desired air gap, and mating components that improve and optimize the magnetic flux path for application specific requirements.

Figure 6:
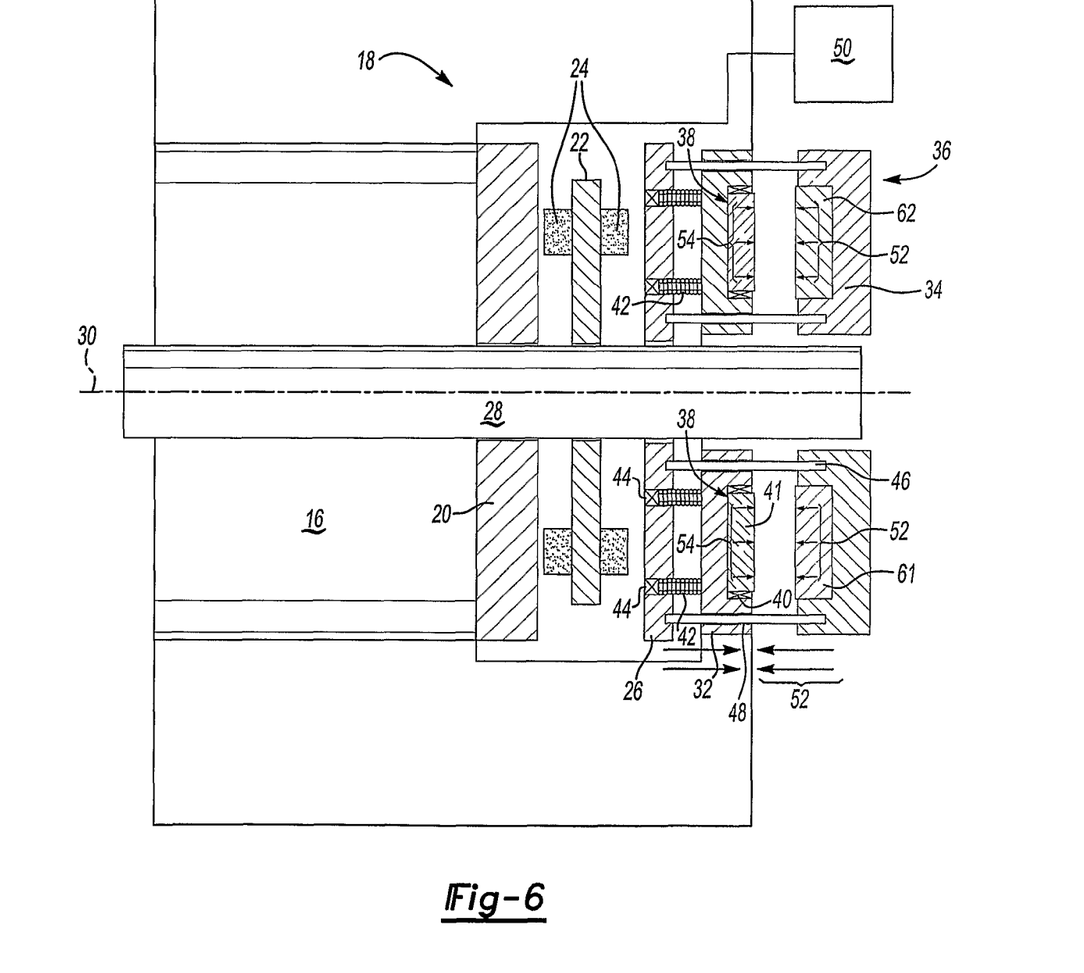
FIG. 6 is a schematic view of the example elevator brake system in a lifted position
Figure 7:
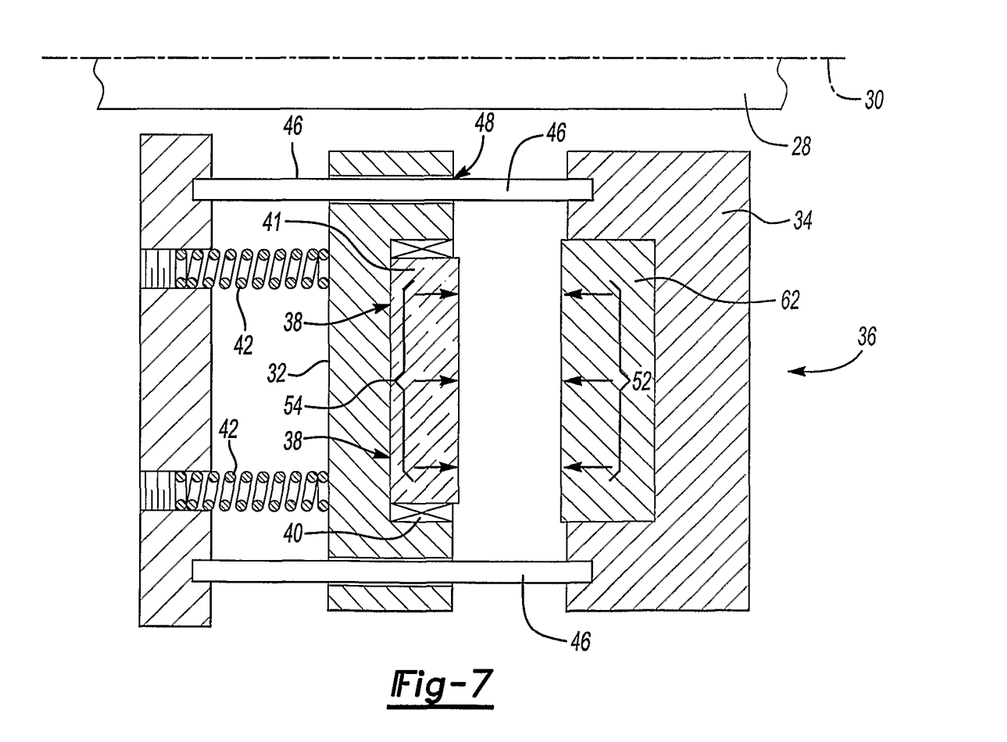
FIG. 7 is a schematic view of the interface between the permanent magnet and the electromagnet in a lifted position.

Referring to FIGS. 6 and 7, the brake assembly 18 is shown in a released position or lifted position. The plate 26 is out of clamping contact with the disk 22 in the lifted position. Release of clamping contact provides for rotation of the disk 22 and thereby the shaft 28. The lifted position is provided by actuating the electromagnet 38 to generate a second magnetic field 54 opposing the first magnetic field 52 generated by the permanent magnets 36. Supplying current from a controller 50 (FIG. 6) to coils 40 of the electromagnets 38 generate the second magnetic field 54. In one example, the amount of current applied to the coils 40 governs the magnitude of strength of the second magnetic field 54. One example includes controlling the polarity of the current to direct the magnetic field as desired.

The second magnetic field 54 is greater than the first magnetic field 52 generated by the permanent magnet 36. The combination of the first and second magnetic fields 52, 54 results in an overall repelling force that drives the permanent magnet housing 34 axial away from the electromagnet housing 32. Movement of the permanent magnet housing 34 produces corresponding axial movement of the pins 46 and the plate 26. The axial movement of the plate 26 releases the disk 22 such that no braking force is applied.

The electromagnets 38 produce the second magnetic field 54 in strength proportional to an applied current from the controller 50. Accordingly, control of the amount and rate that current is applied provides control over movement of the permanent magnet housing 34. Current is controlled proportionally such that as a distance between the electromagnet housing 32 and the permanent magnet housing 34 changes, the forces can be accordingly adjusted to prevent uncontrolled impacts that can generate undesirable noise.

In the illustrated example, coil springs 42 are provided between the plate 26 and the axially fixed electromagnet housing 32. The coil springs 42 bias the plate 26 toward the dropped position. Although coil springs 42 are illustrated other spring members, such as Belleville washers are within the contemplation of this invention.

The coil springs 42 provide the bias force in the same direction as the permanent magnets 36. The coil springs 42 also provide an adjustment function for balancing the forces produced by the permanent magnets 36 against the forces produced by the electromagnets 38. The example coil springs 42 are partially disposed within spring pockets 43 within the plate 26. Adjusters 44 provided for each coil spring 42 can adjust the biasing force produced by the springs 42. The adjusters 44 are a known configuration such as for example a threaded plug for changing a depth of the spring pocket 43 and thereby the corresponding spring force. The illustrated example includes four coil springs 42, however, any number of coil springs 42 can be utilized for balancing forces and movement of the plate 26 as are desired for application specific requirements.

The coil springs 42 are disposed within the spring pockets 43 within the plate 26. However, the springs 42 may also be mounted within the electromagnet housing 32. The adjusters 44 are a known configuration such as for example, a threaded plug for changing a depth of the spring pocket 43 and thereby the spring force. In this example, the strength of the magnetic field 54 is sufficient to overcome the bias of the springs 42 and the magnetic field 52 for lifting the brake.

As the distance between the permanent magnet housing 34 and the electromagnet housing 32 increases, the difference in force between the two magnetic fields decreases until an equilibrium position is obtained. In the equilibrium position, the permanent magnets 36 remain in a desired position relative to the fixed electromagnet housing 32. The equilibrium position can be adjusted by modifying the current level in the coils 40.

The brake can then be dropped in a controlled manner by ramping the current level down to regulate movement of the permanent magnet housing 34 as it approaches the electromagnet housing 32. The controller 50 reduces current to the coils 40 from the equilibrium position to move the permanent magnets 36 closer and closer to the fixed electromagnet housing 32 and the dropped position.

Accordingly, the example brake assembly provides for controlled movement and application of the brake to minimize noise without using damping bodies that wear and require replacement. Further, the example brake assembly provides a stable and durable brake assembly.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator brake assembly comprising:
a braking member movable between an engaged position and a disengaged position, wherein in the engaged position the braking member exerts a braking force and in the disengaged position no braking force is exerted;
a permanent magnet generating a first magnetic field for biasing said braking member toward said engaged position;
an electromagnet actuatable for generating a second magnetic field opposing said first magnetic field for repulsing said permanent magnet and holding said braking member in said disengaged position, wherein one of said permanent magnet and said electromagnet is movable with the braking member between said engaged and disengaged position; and
a fixed housing disposed between the braking member on a first side and the permanent magnet and electromagnet on a second side.

2. The assembly as recited in claim 1 wherein said braking member cooperates with the fixed housing to apply a braking force, said electromagnet is fixed relative to movement of said housing and said permanent magnet such that said braking member and said permanent magnet move in unison.

3. The assembly as recited in claim 1 wherein said electromagnet is disposed within the housing and said permanent magnet is moveable relative to said housing.

4. The assembly as recited in claim 3, wherein said electromagnet comprises a coil disposed within said housing, and including a controller that controls a current supplied to said coil for generating said second magnetic field in a selectively controlled manner.

5. The assembly as recited in claim 4, wherein said controller varies the current response to a position of said permanent magnet relative to said housing.

6. The assembly as recited in claim 3, including springs for adjusting movement of said braking member relative to said housing.

7. The assembly as recited in claim 6, including an adjustment device for adjusting a force exerted by said springs between said housing and said braking member to balance a braking force generated by a combination of said springs and said first magnetic field.

8. The assembly as recited in claim 1 including a rotor having friction linings that rotates with a motor that is selectively engaged by said braking member.

9. The assembly as recited in claim 1, wherein said electromagnet includes a plurality of coil assemblies wound about a corresponding plurality of core members that protrude from a face of said electromagnet.

10. The assembly as recited in claim 1, wherein said permanent magnet includes a plurality of north core portions and a corresponding plurality of south core portions protruding from a face surface.

11. An elevator brake assembly comprising:
a braking member movable between an engaged position and a disengaged position, wherein in the engaged position the braking member exerts a braking force and in the disengaged position no braking force is exerted;
a permanent magnet generating a first magnetic field for biasing said braking member toward said engaged position; and
an electromagnet actuatable for generating a second magnetic field opposing said first magnetic field for repulsing said permanent magnet and holding said braking member in said disengaged position, wherein one of said permanent magnet and said electromagnet is movable with the braking member between said engaged and disengaged position, wherein said electromagnet is disposed within a housing and said permanent magnet is moveable relative to said housing and, said housing includes at least one opening, and said permanent magnet and said braking member are coupled together by at least one pin extending at least partially through said at least one opening in said housing.

12. An elevator system comprising;
an elevator car;
a motor assembly for moving said elevator car; and
a braking system comprising a rotor driven by said motor assembly, a braking member selectively movable for engaging said rotor, a permanent magnet generating a first magnetic field biasing said braking member toward engagement with said rotor, and an electromagnet generating a repulsing magnetic field opposing said first magnetic field for holding said braking member in a position disengaged from said rotor, wherein one of said permanent magnet and said electromagnet are movable with the braking member and a fixed housing disposed between the braking member on a first side and the permanent magnet and the electromagnet on a second side.

13. The system as recited in claim 12, wherein said electromagnet generates said repulsive magnetic field in a selective manner for controlling a relative position between said braking member and said rotor.

14. The system as recited in claim 13, wherein said electromagnet is disposed within the housing fixed relative to movement of said braking member and said permanent magnet, said braking member and said permanent magnet are coupled by at least one pin extending at least partially through openings within said housing.

15. The system as recited in claim 14, including a spring between said housing and said braking member for balancing a force exerted by said electromagnet.

16. An elevator system comprising;
an elevator car;
a motor assembly for moving said elevator car; and a braking system comprising a rotor driven by said motor assembly, a braking member selectively movable for engaging said rotor, a permanent magnet generating a first magnetic field biasing said braking member toward engagement with said rotor, and an electromagnet generating a repulsing magnetic field opposing said first magnetic field for holding said braking member in a position disengaged from said rotor, wherein one of said permanent magnet and said electromagnet are movable with the braking member, rwherein said electromagnet is disposed within a housing fixed relative to movement of said braking member and said permanent magnet, said braking member and said permanent magnet are coupled by at least one pin extending at least partially through openings within said housing and said permanent magnet is disposed on an opposite side of said housing from said braking member.

17. A method of controlling an elevator braking system, said method comprising the steps of:
   a) generating a first magnetic field with a permanent magnet for applying a braking force with a braking member disposed on one side of a fixed housing; and
   b) generating a repulsing magnetic field opposing said first magnetic field with an electromagnet for moving the permanent magnet away from the electromagnet in a direction away from a second side opposite the first side of the fixed housing for releasing the braking force and holding a braking member in a released position.

18. The method as recited in claim 17, including selectively controlling current applied to said electromagnet for controlling a strength of said repulsing magnetic field.

19. The method as recited in claim 17, including controlling a relative position between moveable members of the braking system by selectively controlling a difference between said first magnetic field and said repulsing magnetic field.

20. The method as recited in claim 17, wherein one of the permanent magnet and the electromagnet are movable with the braking member.

* * * * *